United States Patent
Hornstein

[15] 3,653,497
[45] Apr. 4, 1972

[54] SHRINK-ON PACKAGING FOR MOTOR VEHICLES

[72] Inventor: Herbert Hornstein, Viersen, Germany

[73] Assignee: Feldmuhle Aktiengesellschaft, Dusseldorf-Oberkassel, Germany

[22] Filed: May 6, 1970

[21] Appl. No.: 35,083

[30] Foreign Application Priority Data

May 12, 1969 Germany..................P 19 24 079.0

[52] U.S. Cl............................................206/46 M, 53/30
[51] Int. Cl. ..................................B65d 75/00, B65b 53/02
[58] Field of Search..............206/46 M; 150/52 K; 296/136; 53/30

[56] References Cited

UNITED STATES PATENTS

| | | | |
|---|---|---|---|
| 2,243,981 | 6/1941 | Rowan | 150/52 K |
| 3,508,375 | 4/1970 | Myers | 53/30 |
| 2,620,007 | 12/1952 | Keller | 150/52 K |
| 2,608,198 | 8/1952 | Goodman | 150/52 K UX |

*Primary Examiner*—Leonard Summer
*Attorney*—John A. Howson

[57] ABSTRACT

A shrink-on plastic foil package for protection of motor vehicles in transit or storage. The shrunk-on package envelops the motor vehicle on all sides and a non-shrunk fold of foil extends into the car's interior between the driver's door and the door frame to allow this door to be opened and closed to a degree without damaging the outer shrunk-on package. When the fold is slit the door can be completely opened and closed allowing access to the steering wheel of the vehicle. When the door is closed again the package is sealed against the atmosphere.

7 Claims, 8 Drawing Figures

Patented April 4, 1972

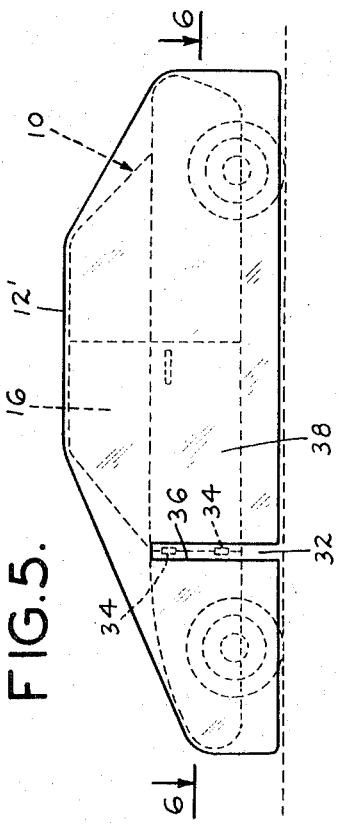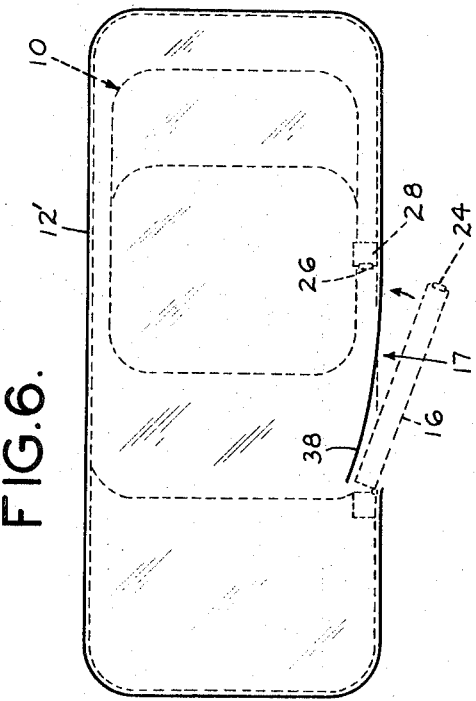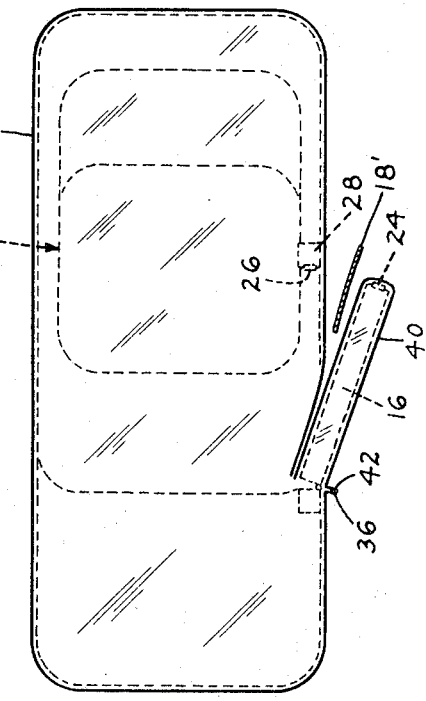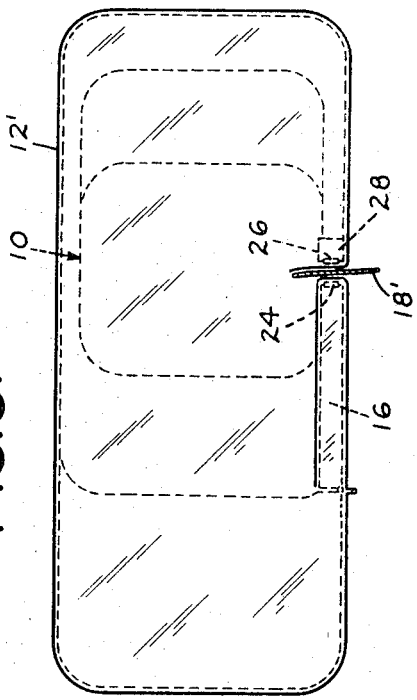

SHRINK-ON PACKAGING FOR MOTOR VEHICLES

BACKGROUND OF THE INVENTION

This invention pertains to a shrink-on package for protection of motor vehicles, particularly passenger automobiles, during transit or storage.

In transporting motor vehicles to dealers or in storing them for a long time at the manufacturer's, it has been customary to coat the motor vehicles with a weatherproof coating which the dealer then has to remove at comparatively great expense to be able to show the automobile in its pristine form. Usually, this coating covers all the bright parts of the automobile, that is, the chrome-plated and nickel-plated parts, and has to be removed by a solvent later on. It was also necessary at least to wash the untreated paint or lacquering of the vehicle, and in some cases to repolish it.

To avoid these shortcomings it has been suggested to package the vehicle in a plastic foil, which is then shrunk onto the vehicle. A shortcoming of this method is that the vehicle can no longer be run since there is no access to the controls of the vehicle without damaging the shrunk-on foil. Once the shrunk-on foil is damaged, the atmosphere again has free access to the vehicle, so that its entire body is unprotected.

SUMMARY OF THE INVENTION

The present invention comprises a shrunk-on plastic foil package for the transportation or storage of motor vehicles which envelops the vehicle on all sides and which is so arranged and dimensioned that at least one door may be opened and closed without damaging the packaging. By damaging the packaging it is meant that the package becomes so altered that it may not be conveniently resealed against the atmosphere by simply closing the door.

The plastic foil, which is first placed over the motor vehicle in the form of a big hood, is dimensioned so that it also envelops an opened door, preferably the door adjacent the driver's seat. The door is then closed with a bulge of two layers of foil remaining between the door and the doorjamb and extending into the interior of the vehicle.

The hood is thereafter heat-shrunk onto the vehicle. The edges of the hood after shrinking seal around the bottom of the vehicle but do not cover the wheels or interfere with their movement. The bulge extending into the interior of the car is protected from the heat-shrinking process and is not shrunk, allowing the door to be slightly opened without damaging the outer envelope shrunk-on over the motor vehicle.

After cutting open the bulge in the foil to allow access to the controls of the vehicle, the door can be completely opened and closed. When the door is closed, two layers of foil lie on each other between the rubber seals of the door and the doorjamb. This prevents the atmosphere from having free access to the interior and exterior surfaces of the vehicle.

The package is removed from the vehicle by the buyer or the retail dealer by simply cutting it open. This eliminates washing off a protective coating as well as washing and polishing the lacquered surfaces of the vehicle.

In another effective embodiment of the invention the plastic envelope covering the vehicle is slit open in a vertical line, at one door's hinge. The door is opened and the foil in the area of the opened door is pulled inside the vehicle. The opened door is then wrapped in a separate hood of plastic foil. The exterior lip of the door's envelope is heat-sealed to the exterior lip in the vehicle's envelope made by the slit.

The vehicle envelope and the door hood are then shrunk-on smoothly with substantially no folds in the region of the door. This makes for a more attractive appearance of the packaged vehicle. After the heat-shrinking process the door is opened and the portion of the vehicle envelope that projects into the vehicle is cut out, allowing entrance to the vehicle's interior. When the door is again closed, the package is weathertight.

In both embodiments the vehicle envelope is shrunk on by heating the plastic foil to a high temperature. A particularly advantageous way to do this is to heat air in a tunnel apparatus to 220° C. and then pass the vehicle through the tunnel. The degree of shrinkage may be controlled by varying the speed at which the vehicle passes through the tunnel.

It is therefore an object of the present invention to produce an inexpensive package for motor vehicles during transportation and storage that affords protection against the weather but which also allows access to the vehicle's controls without damaging the package.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 is a vertical view of another embodiment of the invention showing the vehicle's envelope slit along the hinge line of the driver's door;

FIG. 6 is a horizontal sectional view taken generally along the line 6—6 of FIG. 5 with a portion of the vehicle's foil envelope pulled through the opened doorway of the vehicle;

FIG. 7 is a horizontal sectional view similar to FIG. 6 but with an additional foil hood pulled over the opened door of the vehicle and partially heat-sealed to the vehicle foil envelope;

FIG. 8 is a horizontal sectional view similar to FIG. 7 but with the door closed and the envelopes heat-shrunk onto the door and vehicle.

DESCRIPTION OF CERTAIN PREFERRED EMBODIMENTS

Figure 2:
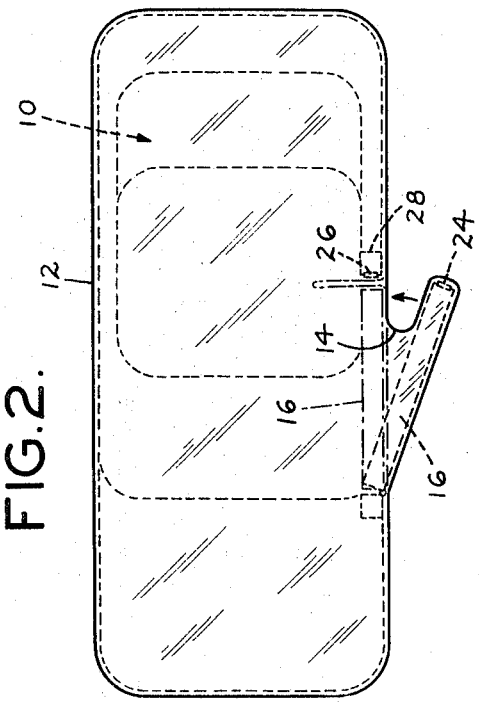
FIG. 2 is a plan view of the embodiment of FIG. 1, showing the driver's door opened.
Figure 1:
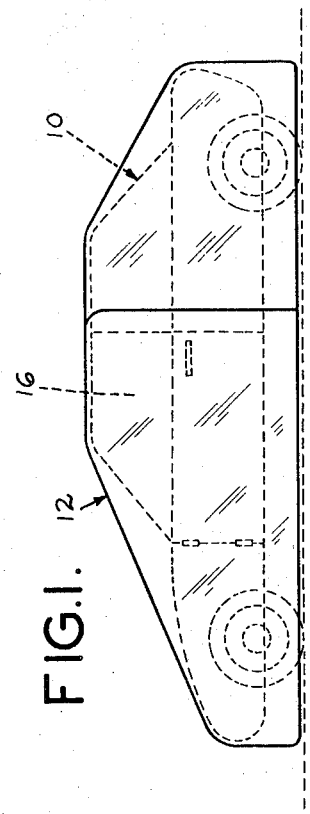
FIG. 1 is a vertical view of a vehicle encompassed by a plastic hood prior to being shrunk onto the vehicle.

One preferred embodiment of the invention comprises an automobile 10 covered by a plastic foil envelope or hood 12 as shown in dotted line fashion in FIGS. 1 and 2. The hood 12 is made of a shrink-on material such as polyethylene, polypropylene, polyester, polyvinyl chloride, or polyvinylidene chloride. The hood 12 is dimensioned so as to have a bulge 14 adjacent the driver's door 16 which allows the door to be partially opened and closed without tearing the hood 12.

Figure 3:
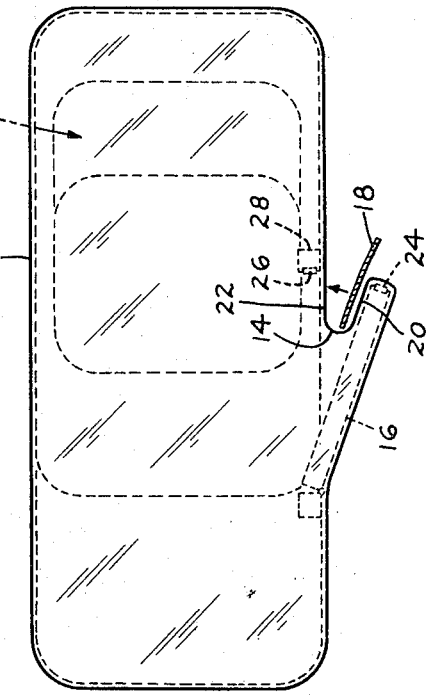
FIG. 3 is a plan view similar to FIG. 2 with the addition of a paper insert between the door and the doorjamb.

With the door 16 partially open, a layer of paper 18 is inserted from outside the hood 12 into the bulge 14, separating the layers of foil 20 and 22 which make up the bulge (see FIG. 3). The door is then closed with the bulge 14 and paper layer 18 extending into the automobile's interior between the door's rubber seal 24 and the rubber seal 26 of the doorjamb 28. The layer of paper 18 prevents the foil layers 20 and 22 from being heat-sealed together during the shrinking process discussed below. Another way to prevent heat-sealing of the fold layers is to use clips to lay part of the foil around the door 16 on the inside, and then pass the vehicle through the shrinking tunnel with the door slightly ajar and the clips attached.

The hood 12 is thereafter heat-shrunk onto the automobile 10 to closely accommodate its contours, with only the bulge 14 which protrudes into the interior of the automobile being non-shrunk. The door 16 may be slightly opened to allow an incision 30 to be made in the bulge 14. This incision 30 allows access to the controls of the automobile 10, and the door 16 can be completely opened and closed without injury to the hood 12. The incision may be just enough to allow entrance into the vehicle's interior or it may extend around the periphery of the door 16 from the top and bottom of its hinge. When the door 16 is closed, the layers of foil 20 and 22 which project into the interior of the automobile 10 are gripped between the rubber seal 24 of the door 14 and the rubber seal 26 of the doorjamb 28 to make a tight closure against the atmosphere.

The shrunk-on hood seals against the bottom edges of the vehicle but does not envelop its wheels. Thus the wheels may be turned freely without injury to the hood 12.

A second preferred embodiment of the invention is shown in FIGS. 5–7 comprising an automobile 10 covered by a plastic foil envelope or hood 12'. The hood 12' is made of material similar to the hood 12 of the embodiment of FIGS. 1–4 and has substantially the same dimensions as the hood 12 except that a slit 32 is made in the hood 12' along the hinge 34 of the door 16. The slit 32 defines an edge 36 in the foil forward of the hinge 54. The flap of foil 38 to the rear of the hinge 34 is then tucked inside the automobile 10 (see FIG. 6) through the doorway 17.

Another foil hood 40 in the shape of a bag (see FIG. 7) is pulled over the end of the opened door 16. The outside edge 42 of the hood 40 is heat-sealed along the edge 36 of the hood 12'. A separating paper insert 18 is inserted between the pressure points of the hoods 40 and 12' in the region of the rubber seal 24 of the door 16 and the rubber seal 26 of the doorjamb 28 to prevent them from being heat-sealed together during the subsequent heat-shrinking process.

With the door 16 closed and the paper insert 18 in place, the hoods 12' and 40 are heat-shrunk onto the automobile 10 to closely accommodate its contours. Thereafter the door 16 is opened and the non-shrunk portion 38 of the foil which was tucked inside the automobile 10 is cut out, making for an easy entrance into the automobile 10 so that an operator may drive it onto ramps for loading purposes. Each time the door 16 is closed the hoods 12' and 40 make a weathertight seal against the atmosphere.

There are several ways in which the film in the above embodiments may be shrunk onto the automobile. By way of illustration, it may be shrunk on using hot air, infrared radiation, or even hot water. The temperatures required depend upon the type of shrink film involved, for example polyethylene film starts shrinking at 120° C. One particular advantageous method is to pass the automobile through a tunnel apparatus in which air has been heated to 220° C. The degree of shrinkage of the film may then be controlled by varying the speed at which the vehicle passes through the tunnel.

Figure 4:
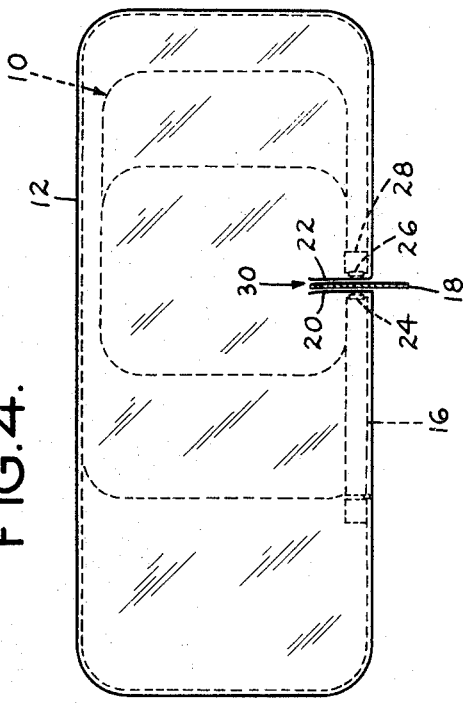
FIG. 4 is a plan view similar to FIG. 2 after the foil is shrunk onto the vehicle and with the driver's door closed.

For purposes of illustration only, the gap between the end of the door 16 and the doorjamb 28 has been exaggerated in FIGS. 4 and 8. As discussed above, when the door is closed, the door seal 24 and the doorjamb seal 26 press the layers of foil between them to make a weathertight closure.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A shrunk-on package for a motor vehicle having at least one door in a frame comprising a foil envelope shrunk onto the motor vehicle, a non-shrunk portion of the foil extending into the interior of the motor vehicle between the door and the door frame, the non-shrunk portion being dimensioned such that the door may be at least partially opened without tearing the vehicle envelope.

2. A shrunk-on package for a motor vehicle having at least one door as recited in claim 1, wherein the non-shrunk portion of the foil has an incision such that the door may be opened to allow access to the interior of the vehicle and closed to make a seal with the envelope against the atmosphere.

3. A shrunk-on package for a motor vehicle having at least one door comprising a first plastic foil envelope shrunk onto the motor vehicle, the first envelope having an opening for the door, a portion of the edges of the foil opening being folded into the interior of the motor vehicle through the doorway, and a second plastic foil envelope shrunk onto the door, the second foil envelope having an exterior edge, a portion of which is connected to a portion of the edge of the first foil envelope about the door opening.

4. A shrunk-on package for a motor vehicle as recited in claim 3 wherein a portion of the exterior edge of the second foil envelope is heat-sealed to a portion of the edge of the first foil envelope about the door opening.

5. A method of packaging for transportation or storage a motor vehicle having at least one door comprising enveloping the vehicle with a shrinkable foil hood, the hood being dimensioned so that it also envelops the opened door of the vehicle, urging a portion of the envelope between the door and doorjamb, closing the door on the bulge, and shrinking the envelope onto the vehicle while leaving the bulge in its unshrunk state.

6. The method recited in claim 5 comprising the further step of opening the door and slitting the bulge to allow access to the controls of the vehicle.

7. A method of packaging for transportation or storage a motor vehicle having at least one door comprising enveloping the vehicle with a first shrinkable foil hood, making a slit in the first foil hood along the hinge line of the door, tucking a portion of the first foil hood on one side of the slit into the vehicle's interior through the doorway, enveloping the opened door in a second foil hood, heat-sealing a portion of an exterior edge of the second foil hood to a portion of an exterior edge of the first foil hood along the slit, closing the door and heat-shrinking the first and second foil hoods about the contours of the motor vehicle.

* * * * *